(12) United States Patent
Nielsen

(10) Patent No.: US 9,213,099 B1
(45) Date of Patent: Dec. 15, 2015

(54) SONAR-BASED UNDERWATER TARGET DETECTION SYSTEM

(71) Applicant: The Boeing Company, Chicago, IL (US)

(72) Inventor: Richard Ove Nielsen, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 474 days.

(21) Appl. No.: 13/776,317

(22) Filed: Feb. 25, 2013

(51) Int. Cl.
*G01S 15/06* (2006.01)
*G01S 15/00* (2006.01)

(52) U.S. Cl.
CPC .............. *G01S 15/06* (2013.01); *G01S 15/003* (2013.01)

(58) Field of Classification Search
CPC ....... G01S 15/003; G01S 15/06; G01S 15/04; G01S 15/325
See application file for complete search history.

(56) References Cited

U.S. PATENT DOCUMENTS

| | | | |
|---|---|---|---|
| 4,244,026 A | | 1/1981 | Dickey, Jr. |
| 6,181,643 B1 * | | 1/2001 | Nielsen .................. 367/119 |
| 6,710,743 B2 * | | 3/2004 | Benner et al. .................. 342/453 |
| 6,995,705 B2 * | | 2/2006 | Bradford et al. ................ 342/95 |
| 7,872,948 B2 * | | 1/2011 | Davis et al. .................... 367/136 |
| 8,059,489 B1 * | | 11/2011 | Lee et al. ....................... 367/136 |
| 2009/0257314 A1 * | | 10/2009 | Davis et al. .................... 367/125 |

OTHER PUBLICATIONS

Wentao et al., "Orthogonal Waveforms Design and Performance Analysis for MIMO Sonar," 10th International Conference on Signal Processing, Oct. 2010, pp. 2382-2385.

Cai et al, "On Orthogonal Waveforn Design for MIMO Sonar," International Conference on Intelligent Control and Information Processing, Aug. 2010, pp. 69-72.

* cited by examiner

*Primary Examiner* — Daniel Pihulic
(74) *Attorney, Agent, or Firm* — Yee & Associates, P.C.

(57) ABSTRACT

A method and apparatus for detecting targets. A sound wave within an underwater detection region is transmitted from each of a number of sources. The sound wave transmitted by each of these sources comprises a pulse train of identical pulses. Pulses are received at a receiver within the underwater detection region. Data is generated in response to receiving the pulses. Correlation data for the pulses is generated based on the data generated by the receiver. A determination is made as to whether each of the pulses received at the receiver is received from a target located within the underwater detection region or from one of the number of sources.

20 Claims, 12 Drawing Sheets

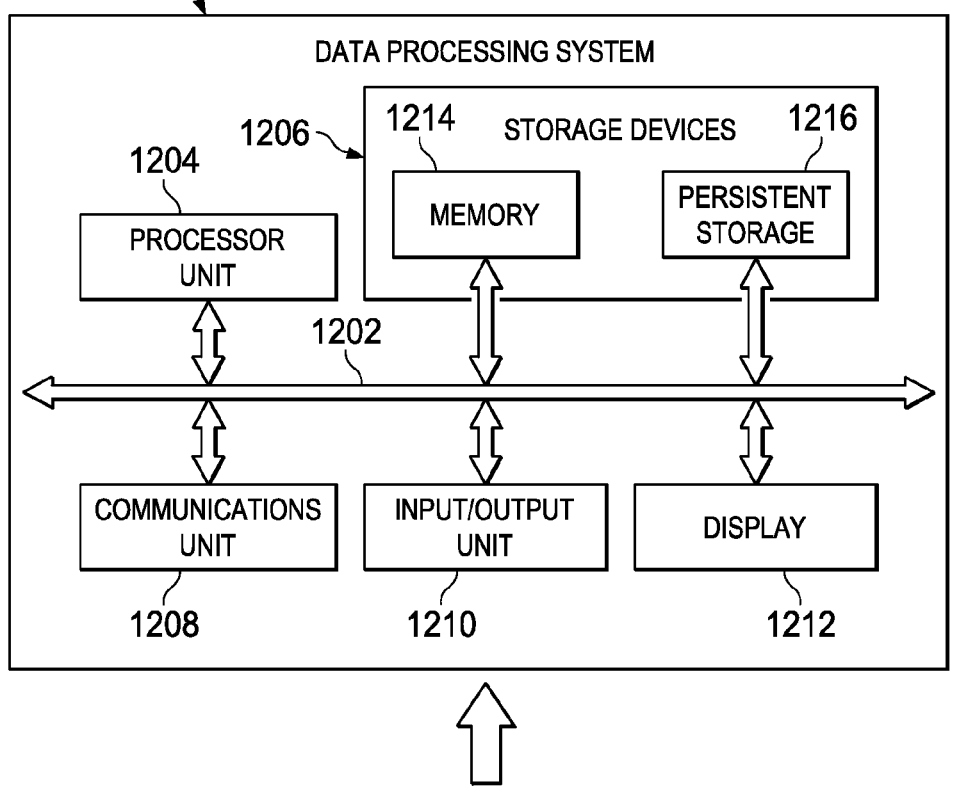
FIG. 12
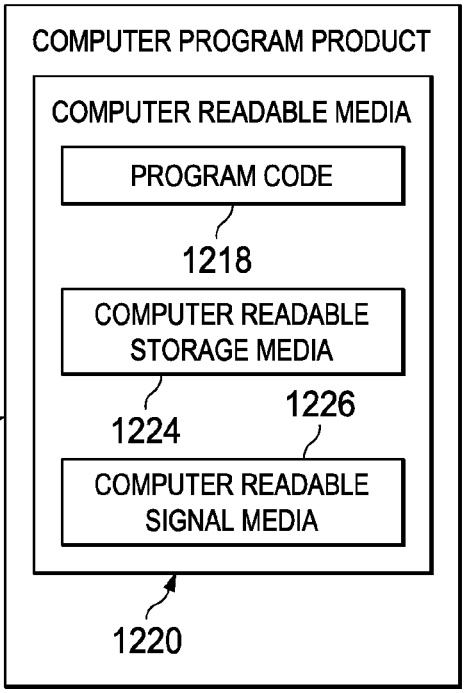

1

SONAR-BASED UNDERWATER TARGET DETECTION SYSTEM

BACKGROUND INFORMATION

1. Field

The present disclosure relates generally to sonar systems and, in particular, to continuous active sonar sonobuoys. Still more particularly, the present disclosure relates to an apparatus and method for detecting and locating underwater targets using continuous active sonar sonobuoys.

2. Background

Sonar, an abbreviation for sound navigation and ranging, is a technique that uses sound propagation for navigation, communications, and/or the detection of underwater objects. As used herein, "underwater" means under the surface of the water. Oftentimes, sonar is used for acoustically locating objects of interest in the water. These objects of interest may be vessels, such as, for example, submarines. An object of interest, as used herein, may be referred to as a "target."

A sonobuoy is a type of sonar device that can be ejected from an aerial vehicle or a water vehicle in a container and then deployed from the container upon impact with the water. Both passive sonobuoys and active sonobuoys may be used for target detection. A passive sonobuoy emits no sound into the water. Rather, a passive sonobuoy listens for sound. In response to detecting sound, the receiver may generate data that is then sent back to the vehicle using, for example, radio communications.

An active sonobuoy emits sound in the form of a pulse wave into the water and listens for the returning echo. As used herein, an "echo" is the reflection of the pulse wave off a target. In other words, the pulse wave emitted by a transmitter in the active sonobuoy may rebound off a target and then be detected by a receiver in the active sonobuoy as an echo. Oftentimes, the pulse wave emitted by the active sonobuoy has a low duty cycle of below about 20 percent. Once an echo is received, the receiver may transmit data to a processor onboard the vehicle using, for example, radio communications.

A continuous active sonar (CAS) sonobuoy may be capable of emitting a pulse wave having a high duty cycle of about 100 percent. In other words, the pulses in the pulse wave may be emitted continuously. An array of continuous active sonar sonobuoys may be positioned within a particular region of water for use in detecting targets. However, the number of continuous active sonar sonobuoys that may be used may be limited by cross-channel interference. Further, the size of the region in which a target may be detected may be limited by the number of sonobuoys that can be used. Therefore, it would be desirable to have a method and apparatus that takes into account at least some of the issues discussed above, as well as other possible issues.

SUMMARY

In one illustrative embodiment, an apparatus comprises a number of sources located within an underwater detection region, a receiver, and a data processor. Each of the number of sources is configured to transmit a sound wave underwater within the underwater detection region. The sound wave comprises a pulse train of identical pulses. The receiver is configured to receive pulses within the underwater detection region. The receiver is further configured to generate data in response to receiving the pulses. The data processor is configured to generate correlation data for the pulses in response to receiving the data from the receiver. The data processor is further configured to determine whether each of the pulses is received from a target located within the underwater detection region or from one of the number of sources.

In another illustrative embodiment, a target detection system comprises a sonar system and a data processor in communication with the sonar system. The sonar system comprises a number of source sonobuoys and a number of receiver sonobuoys. The number of source sonobuoys is configured to continuously transmit a number of sound waves underwater within an underwater detection region. Each of the number of sound waves comprises a pulse train of identical pulses. The number of receiver sonobuoys is configured to receive pulses within the underwater detection region. A receiver in the number of receiver sonobuoys is configured to generate data in response to receiving the pulses. The data processor is configured to receive the data from the receiver. The data processor is further configured to generate correlation data in response to receiving the data from the receiver. The data processor is further configured to determine whether a target pulse has been received at the receiver from a target located within the underwater detection region using the correlation data. The data processor is further configured to identify a location of the target in response to a determination that the target pulse has been received.

In yet another illustrative embodiment, a method is provided. A sound wave within an underwater detection region is transmitted from each of a number of sources. The sound wave comprises a pulse train of identical pulses. Pulses are received at a receiver within the underwater detection region. Data is generated in response to receiving the pulses. Correlation data for the pulses is generated based on the data generated by the receiver. A determination is made as to whether each of the pulses received at the receiver is received from a target located within the underwater detection region or from one of the number of sources.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a data processing system in the form of a block diagram in accordance with an illustrative embodiment.

DETAILED DESCRIPTION

The illustrative embodiments recognize and take into account different considerations. For example, the illustrative embodiments recognize and take into account that it may be desirable to have a target detection system capable of detecting underwater targets with a desired level of accuracy. Further, the illustrative embodiments recognize and take into account that increasing the size of the region within which targets may be detected using a sonar system may be beneficial for performing operations such as navigation, surveillance, and/or other types of operations.

Thus, the illustrative embodiments provide a target detection system configured to detect targets underwater. The target detection system described in the illustrative examples in the figures below may be used to detect the presence of targets and identify the locations of targets underwater.

Figure 1:
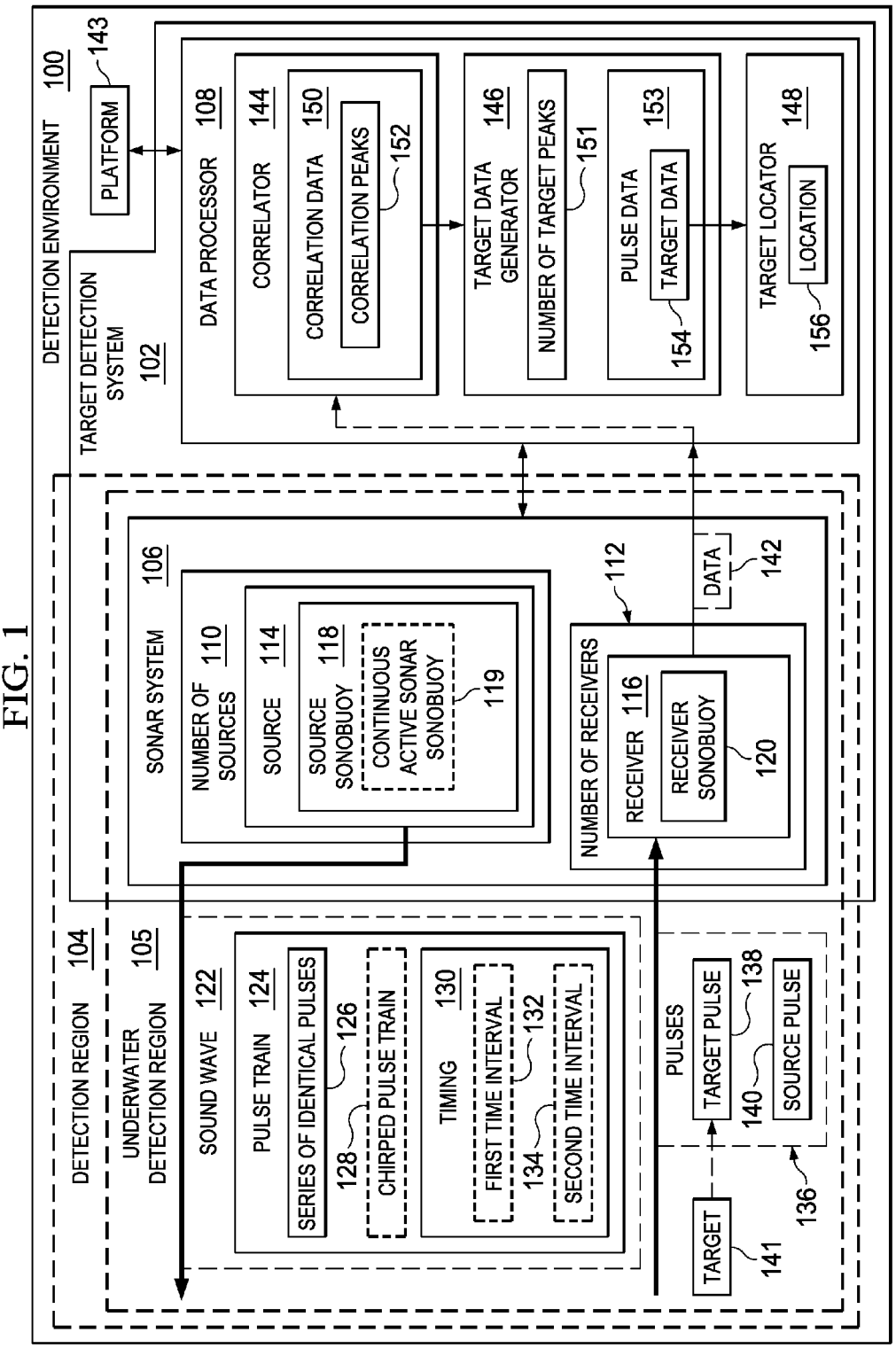
FIG. 1 is an illustration of a detection environment in the form of a block diagram in accordance with an illustrative embodiment.

Referring now to the figures and, in particular, with reference to FIG. 1, an illustration of a detection environment is depicted in the form of a block diagram in accordance with an illustrative embodiment. As depicted, the detection environment 100 includes a target detection system 102 that may be used to detect targets within a detection region 104. In this illustrative example, the detection region 104 is an underwater detection region 105.

As used herein, a "target" may be any object of interest located at least partially within the detection region 104. A target may be, for example, without limitation, a submarine, a ship, a projectile, or some other type of underwater vehicle or object.

The target detection system 102 includes a sonar system 106 and a data processor 108. The sonar system 106 is located entirely within underwater detection region 105 in this illustrative example. As depicted, the sonar system 106 includes a number of sources 110 and a number of receivers 112. As used herein, a "number of" items means one or more sources. In this manner, the sonar system 106 may include one or more sources 110 and one or more receivers 112. In one illustrative example, the sonar system 106 includes a field of sources 110 and a field of receivers 112 that have been arranged within the underwater detection region 105 according to some pattern. For example, without limitation, the sources 110 may be arranged in a grid-like pattern and the receivers 112 may also be arranged in a grid-like pattern.

Each of the sources 110 in the sonar system 106 may be configured to emit sound. Each of the receivers 112 may be configured to receive sound. The sources 110 and the receivers 112 may be implemented in a number of different ways.

As one illustrative example, a source 114 in the sonar system 106 may be implemented using a source sonobuoy 118, while a receiver 116 in the sonar system 106 may be implemented using a receiver sonobuoy 120. A "sonobuoy," as used herein, may be a device, or platform, housing sonar equipment for use underwater. In some illustrative examples, the source 114 and the receiver 116 may be implemented within the same sonobuoy.

The number of sources 110 may transmit a number of sound waves. For example, a source 114 may transmit, or emit, sound into the detection region 104 in the form of a sound wave 122. Depending on the implementation, the source 114 may be omnidirectional or directional. When the source 114 is omnidirectional, the sound wave 122 is emitted in all directions. When the source 114 is directional, the sound wave 122 is emitted in a particular direction. In one illustrative example, the source 114 may take the form of a continuous active sonar (CAS) sonobuoy 119. The continuous active sonar sonobuoy 119 may be an omnidirectional sonobuoy.

As depicted, the sound wave 122 emitted by the source 114 takes the form of a pulse train 124 that is comprised of a series of identical pulses 126. In other words, each pulse in the pulse train 124 may be identical to the other pulses in the pulse train 124 with respect to a number of characteristics. These characteristics may include, for example, without limitation, pulse duration, pulse shape, pulse amplitude, pulse frequency, and/or other types of characteristics. With the sound wave 122 being comprised of the series of identical pulses 126, cross-channel interference at each of the receivers 112 may be reduced.

In one illustrative example, all of the sources 110 in the sonar system 106 may emit the same type of sound wave. In other words, the pulse train 124 emitted by the source 114 may be the same type of pulse train emitted by all of the sources 110. In particular, the pulse train 124 emitted by the source 114 may have a timing 130 that is the same as the timing for the pulse trains emitted by all of the sources 110. The timing 130 may be the timing of one period of the pulse train 124. In this example, the period of the pulse train 124 may have a period that includes a single pulse. The timing 130 may be the time interval between the beginning of one pulse and the beginning of the next pulse.

As one specific illustrative example, the pulse train 124 may take the form of a chirped pulse train 128 having a duty cycle of about 100 percent. As used herein, the "duty cycle" of a pulse train, such as the pulse train 124 emitted by the source 114, is the ratio of the duration of one pulse to the period of the pulse train. With a chirped pulse train 128, the frequency of each pulse either increases or decreases with time.

In some cases, each of the sources 110 may emit different pulse trains. These pulse trains may comprise identical pulses but different timings. For example, the pulse train 124 emitted by the source 114 may have a particular timing 130. Each of the sources 110 may emit a pulse train having a timing that is different from the timings of the pulse trains emitted by the other source sonobuoys. However, the individual pulses in the pulse trains emitted by all of the source sonobuoys may be substantially identical.

In this illustrative example, the pulse train 124 may have a period that includes two pulses, which may be referred to as a pulse pair. The timing 130 may include at least two time intervals. For example, the timing 130 may include a first time interval 132 and a second time interval 134. The first time interval 132 may be the time interval that elapses between the beginning of the period and a first pulse in that period. The second time interval 134 may be the time interval that elapses between the end of the first pulse and the beginning of the second pulse. These two pulses and two time intervals constitute a single period of the pulse train 124 and may be repeated continuously within the pulse train 124.

The receivers 112 are configured to listen for sound within the underwater detection region 105. For example, the receiver 116 may be configured to receive pulses 136 over time. Pulses 136 may include, for example, without limitation, one or more target pulses and/or one or more source pulses.

A target pulse 138 may be any pulse that is an echo received from a target, such as target 141 located within underwater detection region 105. This echo may be the reflection of, or the rebounding of, a pulse emitted by one of the sources 110 off of the target 141.

A source pulse 140 may be any pulse that is received directly from one of the sources 110. In other words, a source pulse 140 may propagate from one of the sources 110 directly to the receiver 116 through the underwater detection region 105 without being reflected off or rebounding off another object.

In response to receiving pulses 136, the receiver 116 generates data 142. More specifically, the receiver 116 is configured to convert the sound energy received in the pulses 136 into an electrical signal, which may be a discretized electrical signal that forms data 142. The receiver 116 sends the data 142 to the data processor 108 for processing. The data 142 may be sent to the data processor 108 using any number of communications links. For example, the data processor 108 may receive the data 142 over at least one of a wireless communications link, a wired communications link, an optical communications link, or some other type of communications link.

As used herein, the phrase "at least one of", when used with a list of items, means different combinations of one or more of the listed items may be used but only one item in the list of items may be needed. The item may be a particular object, thing, or category. In other words, "at least one of" means that any combination of items and any number of items may be used from the list but not all of the items in the list are required.

For example, "at least one of item A, item B, or item C" may include, without limitation, item A, item A and item B, or only item B. For example, "at least one of item A, item B, or item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination.

Depending on the implementation, the data processor 108 may be implemented using hardware, software, or a combination of the two. In one illustrative example, the data processor 108 may be implemented using a computer system. The computer system may be comprised of one or more computers. When more than one computer is present, these computers may be in communication with each other. Further, these computers may or may not be located in the same location. In some cases, the data processor 108 may be implemented using a processor unit, a microprocessor, an integrated circuit, and/or some other type of hardware.

In one illustrative example, the data processor 108 may be entirely located within a platform 143 that is located outside of the underwater detection region 105. The platform 143 may be, for example, without limitation, an aerial platform, a marine platform, a space-based platform, or some other type of platform. In particular, the platform 143 may take the form of an aircraft, an unmanned aerial vehicle (UAV), a ship, a submarine, a stationary water-based station, a satellite station, a ground station, or some other type of platform.

In some illustrative examples, a portion of the data processor 108 may be implemented within the receiver 116, while another portion of the data processor 108 may be implemented within the platform 143. In other illustrative examples, a portion of the data processor 108 may be implemented within each of the receivers 112 of the sonar system 106. In still other illustrative examples, the data processor 108 may be entirely implemented in the receivers 112 and may be equally distributed among the receivers 112.

As depicted, the data processor 108 may include a correlator 144, a target data generator 146, and a target locator 148. The correlator 144 may be configured to receive the data 142 and generate correlation data 150 based on the data 142. The correlation data 150 may include, for example, without limitation, correlation peaks 152. Each of the correlation peaks 152 may correspond to a corresponding one of the pulses 136 received by the receiver 116.

In this illustrative example, the correlator 144 may compare the data 142 to stored data for a pulse. The pulse may be substantially identical to the pulses emitted by the sources 110. Any time that the correlator 144 matches a portion of the data 142 to the stored data for the pulse, within selected tolerances, a correlation peak is generated. In other words, the correlator 144 generates a correlation peak each time the correlator 144 identifies a portion of the data 142 that represents a pulse according to the stored data. In other words, each of the correlation peaks 152 represents a pulse.

The correlator 144 sends the correlation data 150 to the target data generator 146. The target data generator 146 may be configured to determine which of the correlation peaks 152, if any, represent target pulses and which of the correlation peaks 152 represent source pulses. The target data generator 146 identifies a subset of the correlation peaks as a number of target peaks 151. Each of these target peaks 151 corresponds to a target pulse. In one illustrative example, the target data generator 146 identifies any correlation peak corresponding to a pulse received at an unexpected time based on the known pulse patterns for the pulses emitted by the sources 110 as a target peak.

The target data generator 146 generates pulse data 153 based on the correlation peaks identified. In particular, for each of the target peaks 151 identified, the target data generator 146 identifies target data 154. The pulse data 153 may include, for example, without limitation, a time of arrival, a bearing, and/or other types of measurements for each of the pulses represented by a correlation peak. The target data 154 may include a time of arrival, a bearing, a target hold time, a bearing extent, a time change, and/or other data.

A time of arrival for a pulse is the time at which the receiver received the pulse based on the data. A bearing is a direction from which the pulse was received. The bearing may be to a source 114 or to the target 141, depending on the type of pulse. The target hold time may be the time period over which the target pulse was detected. The bearing extent may be the corresponding change in bearing to the target during the target hold time.

The target data generator 146 is configured to identify which of the sources 114 emitted the original pulse that was rebounded off the target 141 as a target pulse using the pulse data 153. The target data generator 146 sends this identification to the target locator 148. The target locator 148 identifies a location 156 for each of the target pulses represented by the target peaks 151.

The location 156 may be the location of the target represented by the target peak. For example, each of the target peaks 151 may represent a target pulse, or echo, received from the target 141 located within the underwater detection region 105. The location 156 may be the location of the target 141 at the time that the target pulse was received by the receiver 116. By identifying a location 156 for each of the target peaks 151, the various locations of the target 141 over time may be identified. In this manner, the target 141 may be tracked.

Figure 9:
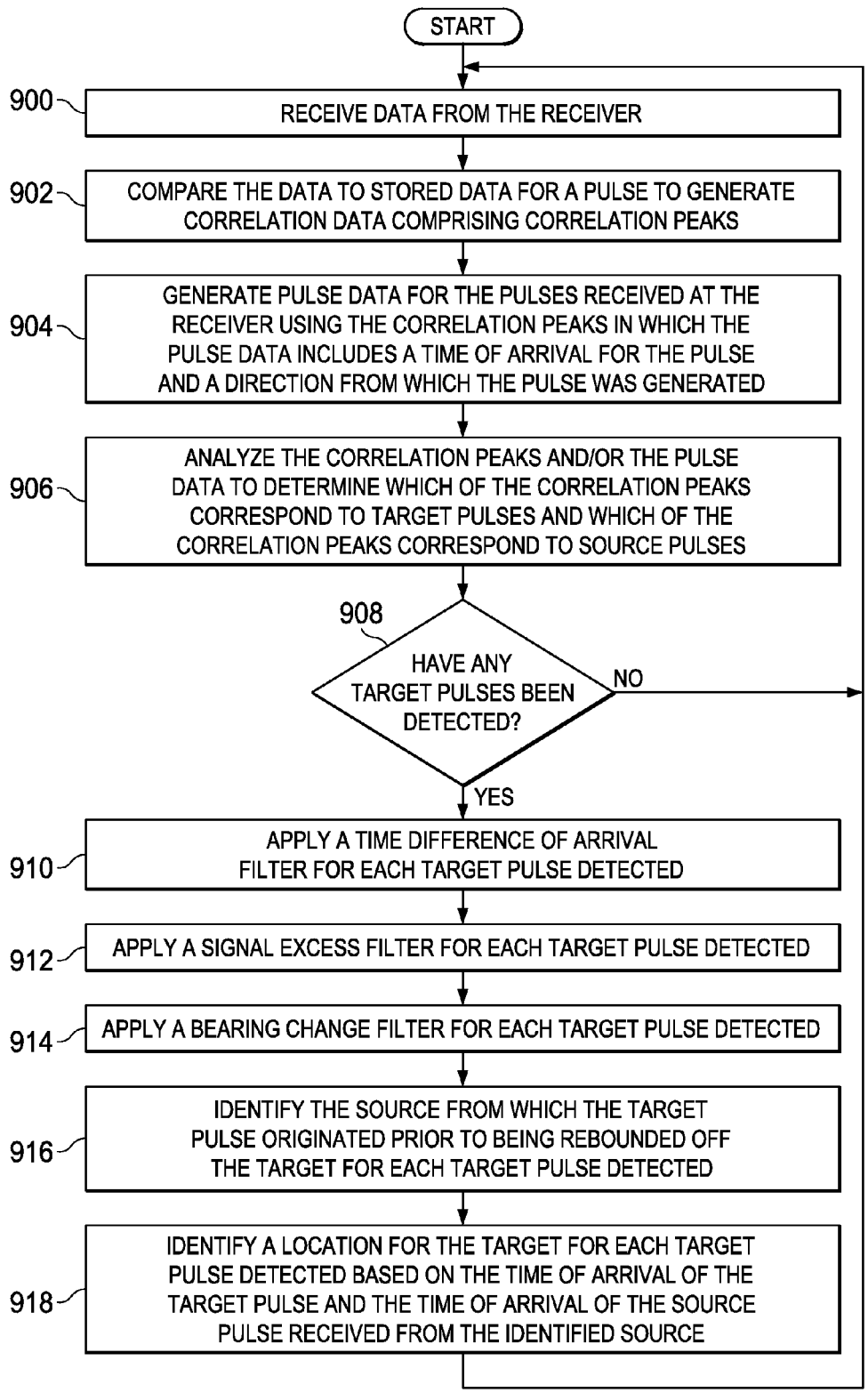
FIG. 9 is an illustration of a process for detecting targets using a first approach in the form of a flowchart in accordance with an illustrative embodiment.
Figure 10:
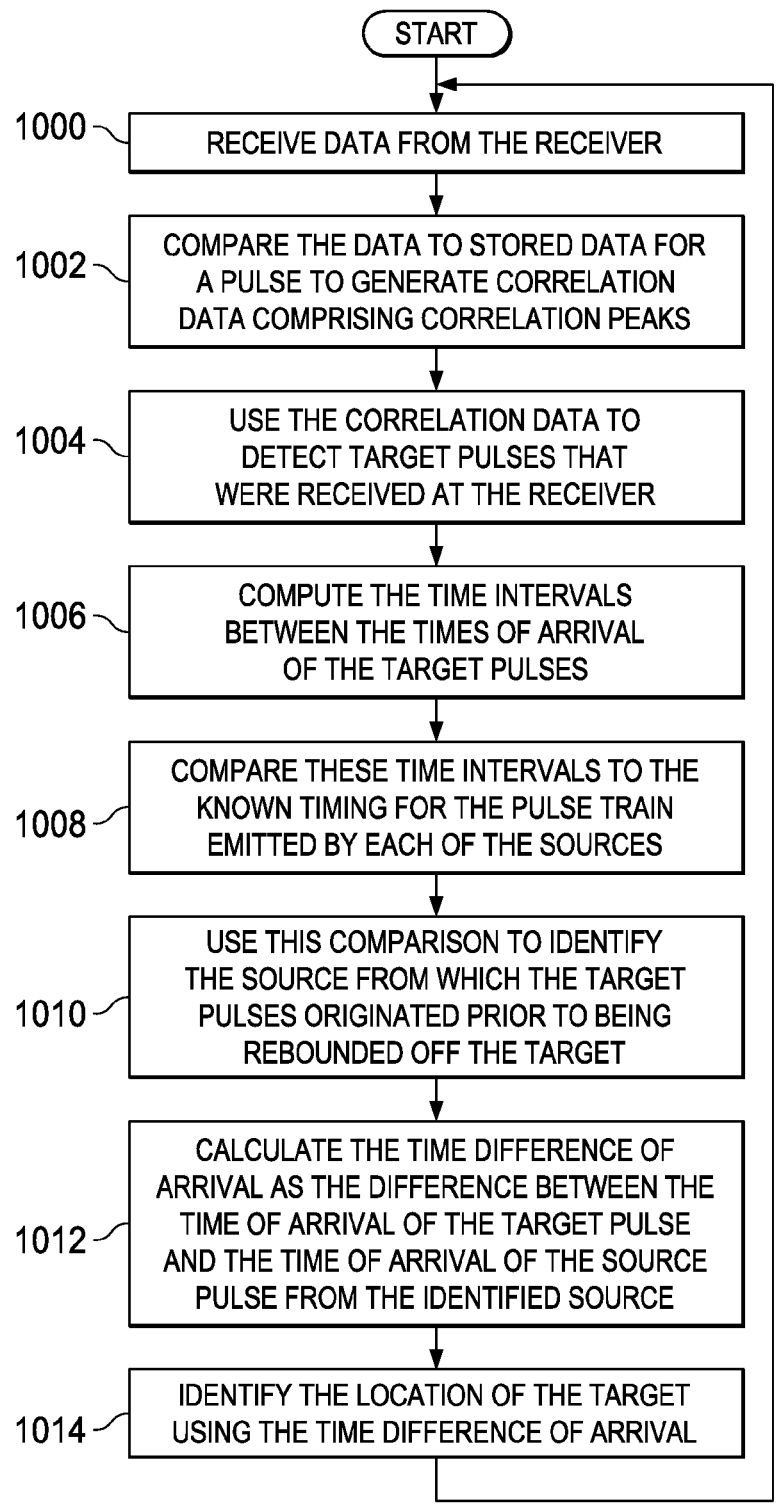
FIG. 10 is an illustration of a process for detecting targets using a second approach in the form of a flowchart in accordance with an illustrative embodiment.

The processes by which the target data generator 146 is configured to generate the target data 154 and by which the target locator 148 is configured to identify the location 156 for each of target peaks 151 is described in greater detail in FIGS. 9-10. Further, the process by which the target data generator 146 is configured to identify the target peaks 151 from the correlation peaks 152 is described in greater detail in FIG. 11.

The illustration of detection environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
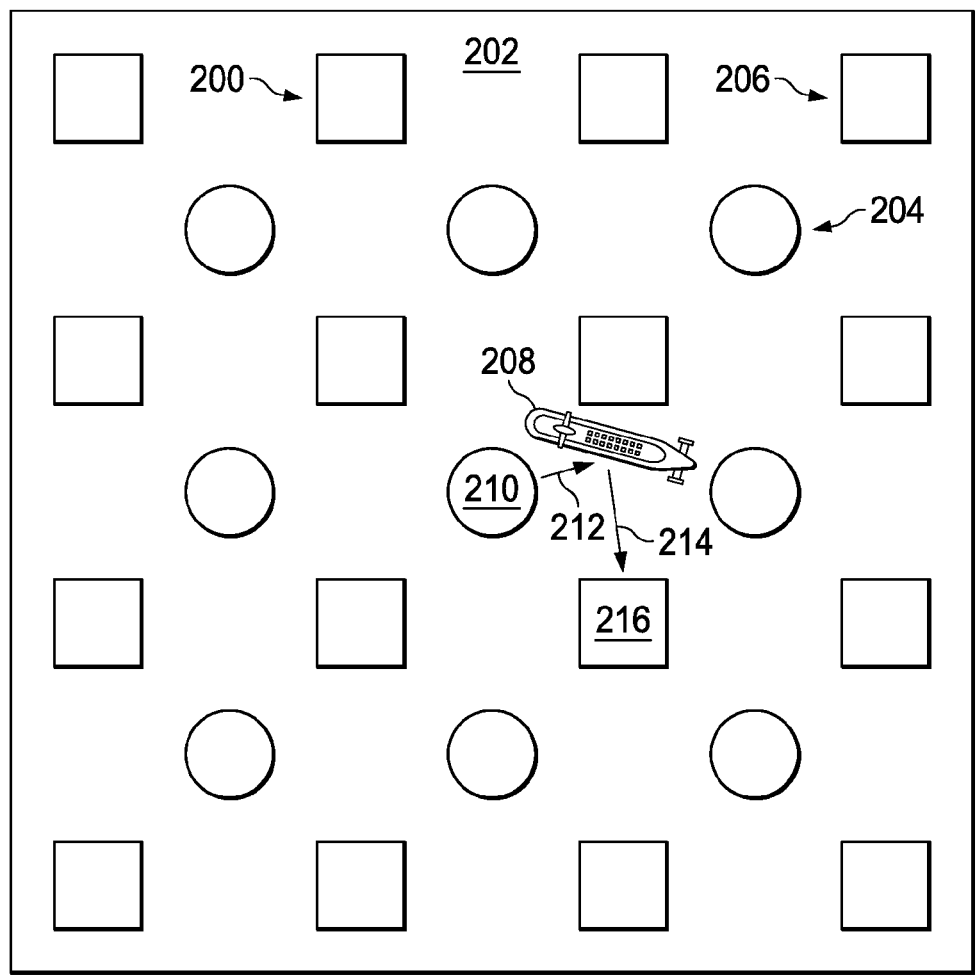
FIG. 2 is an illustration of a target detection system in accordance with an illustrative embodiment.

With reference now to FIG. 2, an illustration of a target detection system is depicted in accordance with an illustrative embodiment. The target detection system 200 depicted in FIG. 2 may be an example of one implementation for the target detection system 102 described in FIG. 1.

The target detection system 200 may be used to detect targets within an underwater detection region 202. The target detection system 200 includes source sonobuoys 204 and receiver sonobuoys 206. These source sonobuoys 204 and receiver sonobuoys 206 form a sonar system, such as the sonar system 106 described in FIG. 1. The source sonobuoys 204 and receiver sonobuoys 206 may be used to detect the presence of a target 208 located within the underwater detection region 202. The target 208 is a submarine in this illustrative example.

As depicted, a source sonobuoy 210 may emit a pulse train 212. The pulse train 212 may be comprised of a series of identical pulses. The pulse train 212 may be reflected off the target 208 as a target pulse train 214 and received by a receiver sonobuoy 216. The target pulse train 214 may be comprised of target pulses. The receiver sonobuoy 216 may also receive the pulse train 212 directly from the source sonobuoy 210.

Figure 3:
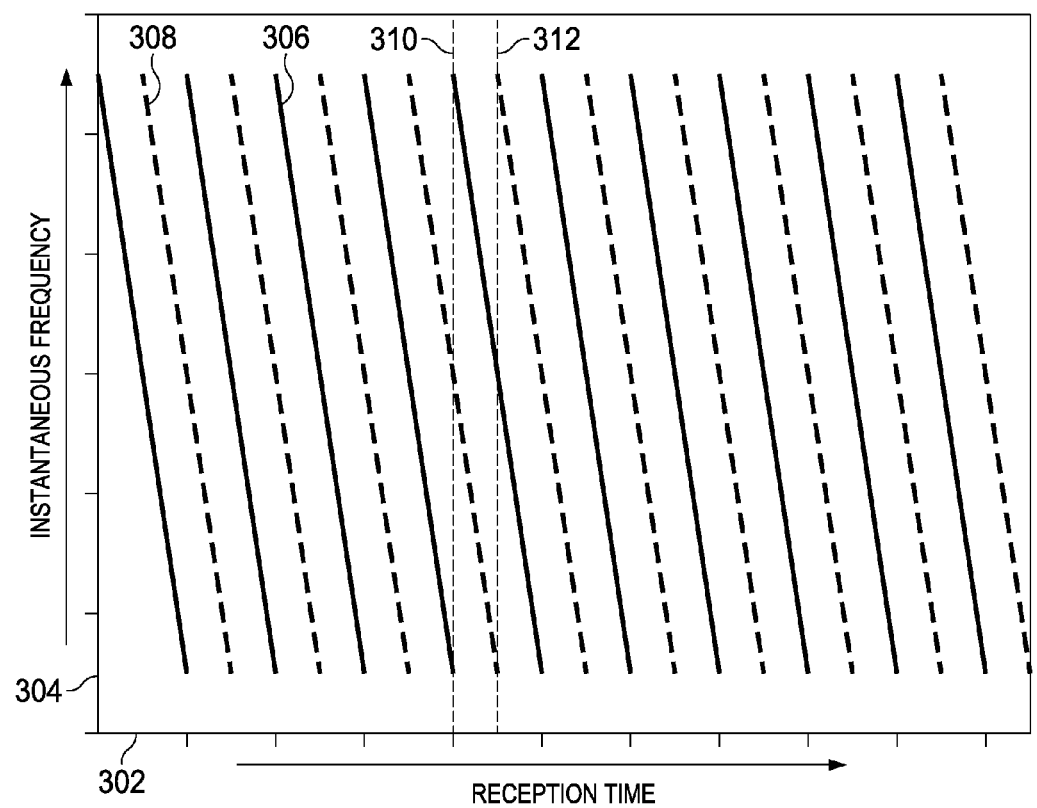
FIG. 3 is an illustration of a plot of a source pulse train and a target pulse train in accordance with an illustrative embodiment.

Turning now to FIG. 3, an illustration of a plot of a source pulse train and a target pulse train is depicted in accordance with an illustrative embodiment. In FIG. 3, the plot 300 has a horizontal axis 302 and a vertical axis 304. The horizontal axis 302 is reception time with respect to the receiver that receives the pulse trains. The vertical axis 304 is instantaneous frequency. In one illustrative example, the reception time may be in seconds and the instantaneous frequency may be in hertz.

The plot 300 includes a source pulse train 306 and a target pulse train 308. The source pulse train 306 is the pulse train received at the receiver directly from a source. The target pulse train 308 is the pulse train that was originally emitted from a source and then was reflected off a target.

As depicted, both the source pulse train 306 and the target pulse train 308 are chirped pulse trains. In particular, the frequency of each pulse of both of these pulse trains decreases over the duration of the pulse. Time 310 indicates the point in time at which a previous pulse ends and a new pulse begins in the source pulse train 306. Similarly, time 312 indicates the point in time at which a previous pulse ends and a new pulse begins in the target pulse train 308.

The duty cycle for each of these pulse trains may be substantially 100 percent. In this manner, both the source pulse train 306 and the target pulse train 308 may be comprised of identical pulses that repeat continuously without any delay between pulses.

Figure 4:
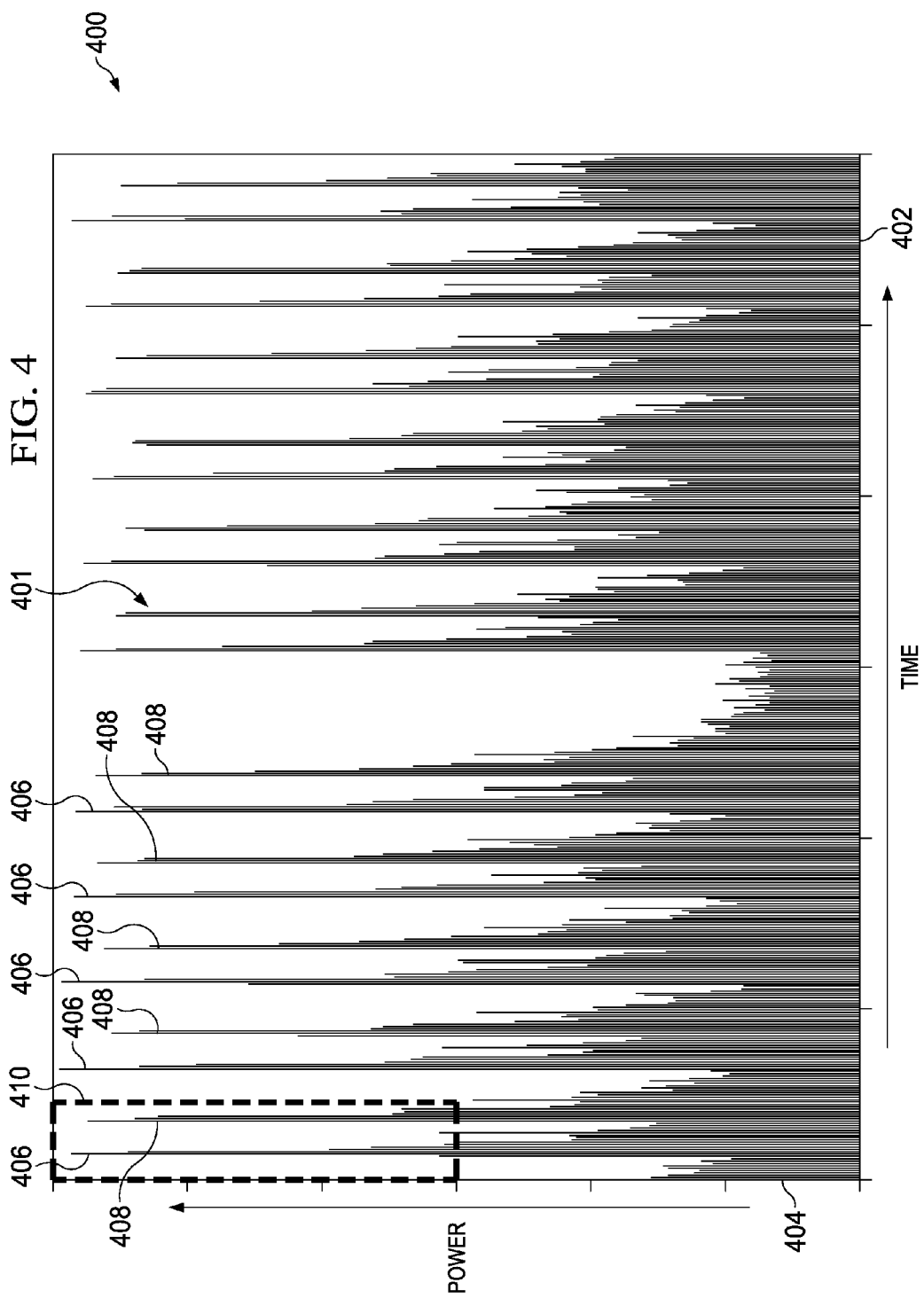
FIG. 4 is an illustration of a plot of correlation data in accordance with an illustrative embodiment.

With reference now to FIG. 4, an illustration of a plot of correlation data is depicted in accordance with an illustrative embodiment. The plot 400 of correlation data 401 in FIG. 4 corresponds to the source pulse train 306 and the target pulse train 308 from FIG. 3. The plot 400 has a horizontal axis 402 and a vertical axis 404. The horizontal axis 402 is time. The vertical axis 404 is power. In one illustrative example, the time may be in seconds and the power may be in decibels.

The correlation data 401 comprises correlation peaks in which each of the correlation peaks represents a pulse. Set of correlation peaks 406 represent the pulses of the source pulse train 306 in FIG. 3. Set of target correlation peaks 408 represent the pulses of the target pulse train 308 in FIG. 3. An enlarged view of portion 410 of the plot 400 is depicted in FIG. 5.

Figure 5:
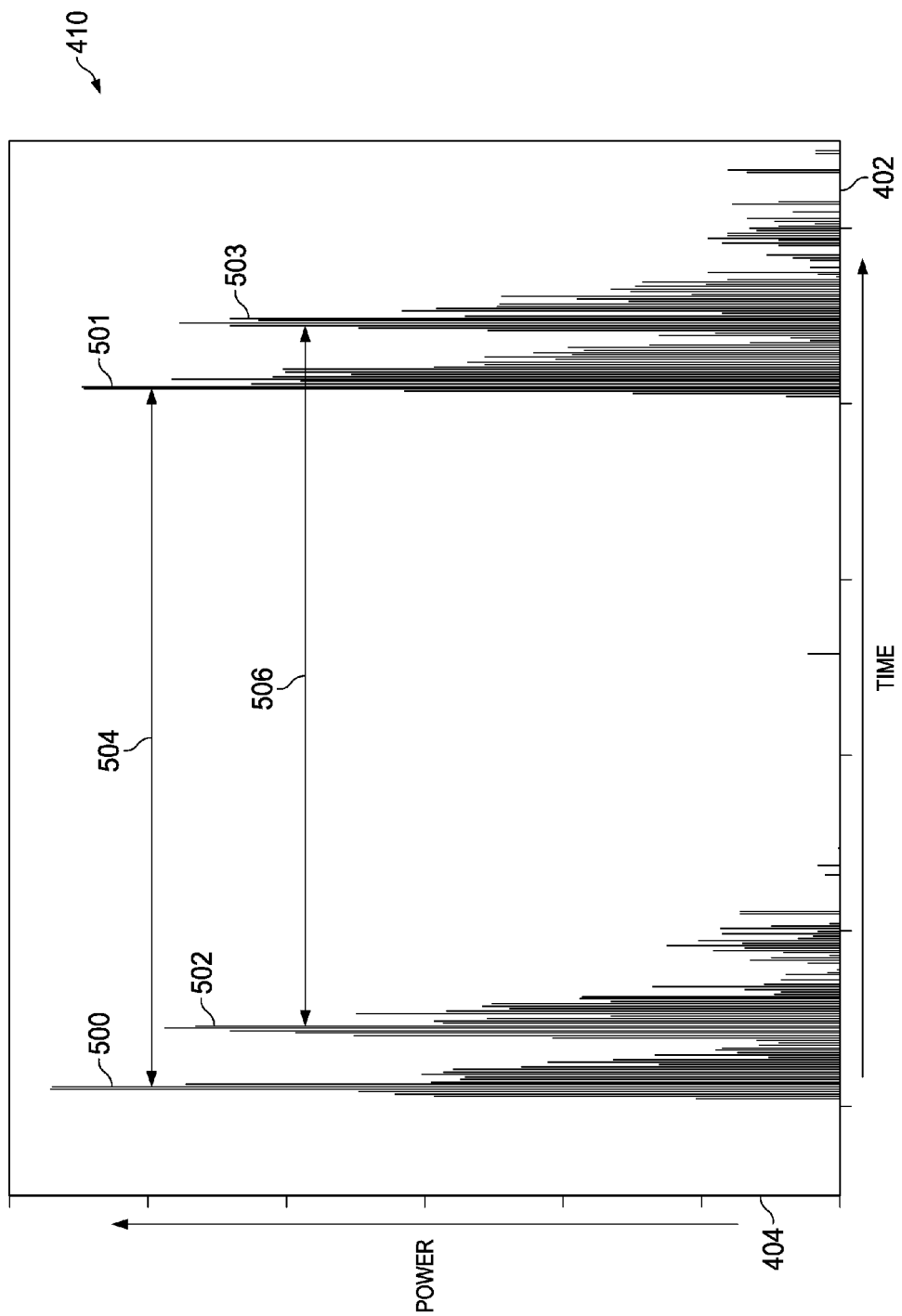
FIG. 5 is an illustration of an enlarged view of a portion of the plot of correlation data in accordance with an illustrative embodiment.

Turning now to FIG. 5, an illustration of an enlarged view of a portion 410 of the plot 400 of the correlation data 401 from FIG. 4 is depicted in accordance with an illustrative embodiment. In this illustrative example, correlation peak 500 and correlation peak 501 correspond to consecutive pulses received in the source pulse train 306 from FIG. 3. Target correlation peak 502 and target correlation peak 503 correspond to consecutive pulses received in the target pulse train 308 from FIG. 3.

As depicted, the time interval 504 between correlation peak 500 and correlation peak 501 and the time interval 506 between target correlation peak 502 and target correlation peak 503 may be substantially equal. However, the signal level of target correlation peak 502 and target correlation peak 503 may be lower than correlation peak 500 and correlation peak 501, respectively. Some of this power may have been lost when the original pulse train emitted by the source was rebounded off the target.

Figure 6:
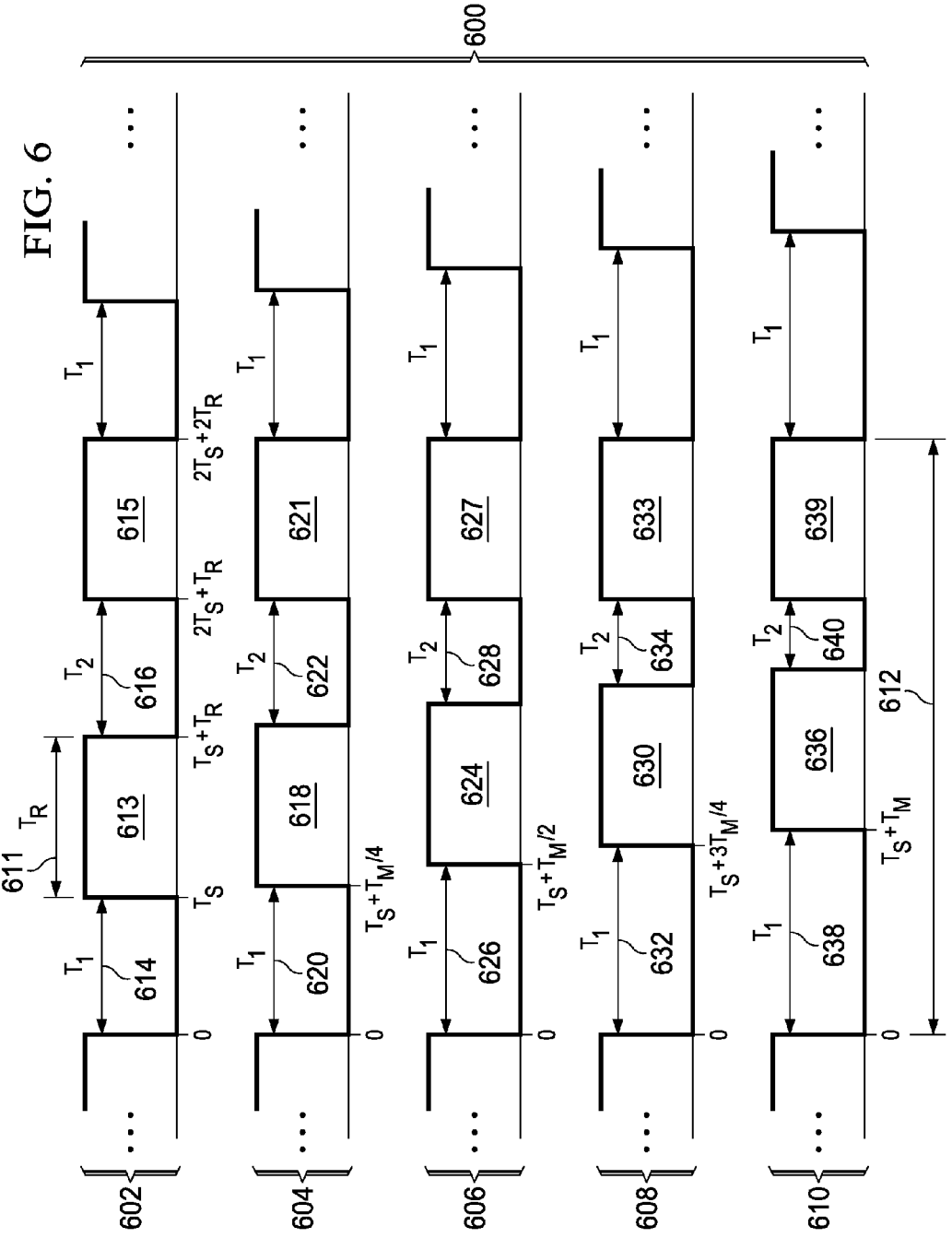
FIG. 6 is an illustration of a plurality of pulse trains in accordance with an illustrative embodiment.

With reference now to FIG. 6, an illustration of a plurality of pulse trains is depicted in accordance with an illustrative embodiment. The pulse trains 600 may be the pulse trains emitted by corresponding sources. The pulse trains 600 include a first pulse train 602, a second pulse train 604, a third pulse train 606, a fourth pulse train 608, and a fifth pulse train 610.

In this illustrative example, the first pulse train 602, the second pulse train 604, the third pulse train 606, the fourth pulse train 608, and the fifth pulse train 610 may each be comprised of a series of identical pulses. Each of the pulses in each of these pulse trains may have the same pulse duration 611. Further, each of the pulses in each of these pulse trains may have the same period 612 comprising two pulses. However, each of these pulse trains 600 may have a different timing within this period 612. In particular, the timing for each pulse train may be comprised of two time intervals that are different from the other pulse trains.

For example, within the period 612 of the first pulse train 602, the time between the beginning of the period 612 and the beginning of the first pulse 613 may be the first time interval 614. The time between the end of the first pulse 613 and the beginning of the second pulse 615 may be the second time interval 616.

Further, within the period 612 of the second pulse train 604, the time between the beginning of the period 612 and the beginning of the first pulse 618 may be the first time interval 620. The time between the end of the first pulse 618 and the beginning of the second pulse 621 may be the second time interval 622.

Within the period 612 of the third pulse train 606, the time between the beginning of the period 612 and the beginning of the first pulse 624 may be the first time interval 626. The time between the end of the first pulse 624 and the beginning of the second pulse 627 may be the second time interval 628. Within the period 612 of the fourth pulse train 608, the time between the beginning of the period 612 and the beginning of the first pulse 630 may be the first time interval 632. The time between the end of the first pulse 630 and the beginning of the second pulse 633 may be the second time interval 634.

Lastly, within the period 612 of the fifth pulse train 610, the time between the beginning of the period 612 and the beginning of the first pulse 636 may be the first time interval 638. The time between the end of the first pulse 636 and the beginning of the second pulse 639 may be the second time interval 640.

The first time intervals 614, 620, 626, 632, and 638 may all be different. Similarly, the second time intervals 616, 622, 628, 634, and 640 may all be different.

Figure 7:
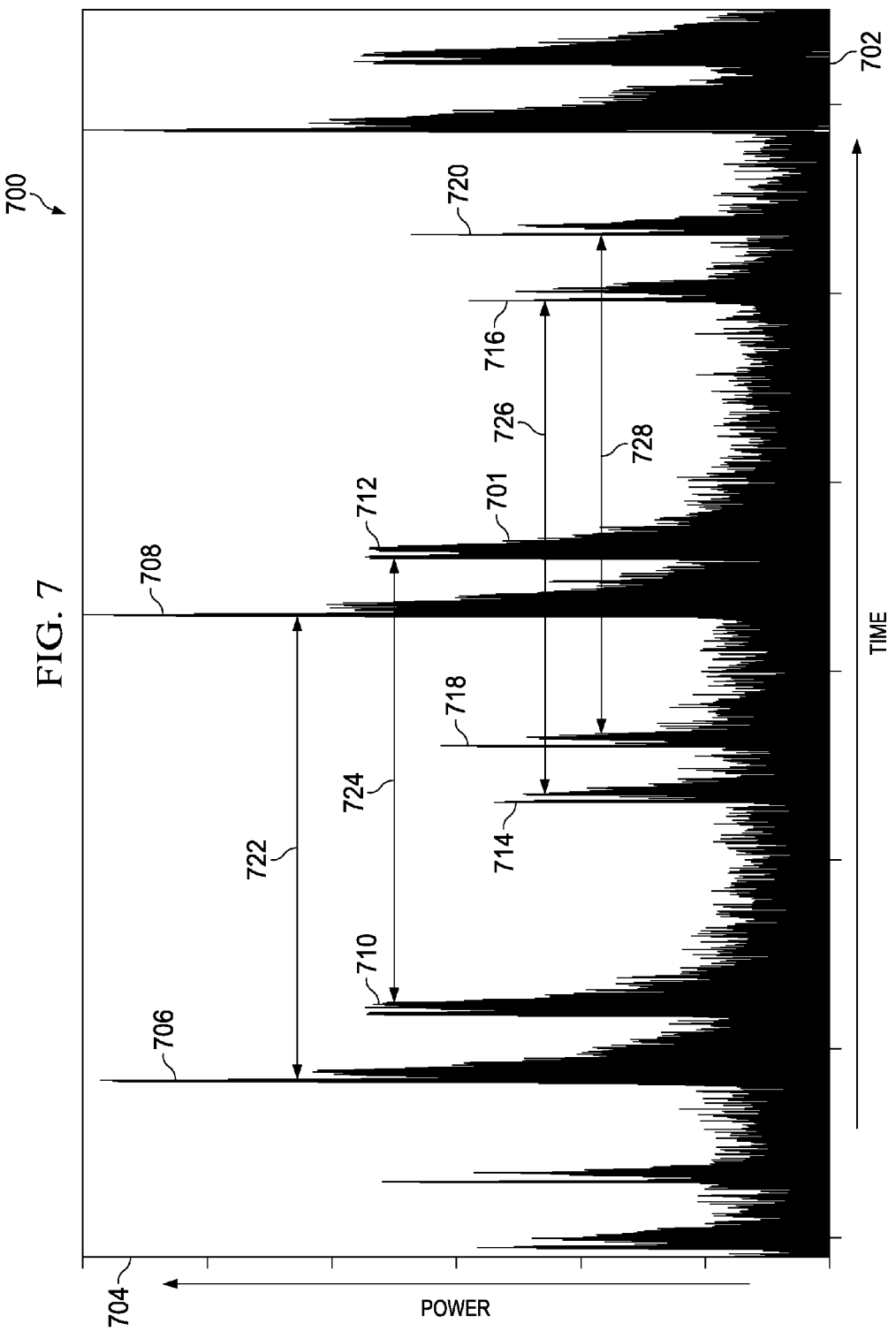
FIG. 7 is an illustration of a plot of correlation data in accordance with an illustrative embodiment.

With reference now to FIG. 7, an illustration of a plot of correlation data is depicted in accordance with an illustrative embodiment. The plot 700 of correlation data 701 in FIG. 7 corresponds to source pulse trains. The plot 700 has a horizontal axis 702 and a vertical axis 704. The horizontal axis 702 is time. The vertical axis 704 is power. In one illustrative example, the time may be in seconds and the power may be in decibels.

In this illustrative example, a first correlation peak 706 and a second correlation peak 708 belong to a first source pulse train. A third correlation peak 710 and a fourth correlation peak 712 belong to a second source pulse train. A fifth correlation peak 714 and a sixth correlation peak 716 belong to a third source pulse train. Further, a seventh correlation peak 718 and an eighth correlation peak 720 belong to a fourth source pulse train.

The time between the first correlation peak 706 and the second correlation peak 708 is a first time interval 722. The time between the third correlation peak 710 and the fourth correlation peak 712 is a second time interval 724. The time between the fifth correlation peak 714 and the sixth correlation peak 716 is a third time interval 726. The time between the seventh correlation peak 718 and the eighth correlation peak 720 is a fourth time interval 728. The first time interval 722, the second time interval 724, the third time interval 726, and the fourth time interval 728 may all be different.

Figure 8:
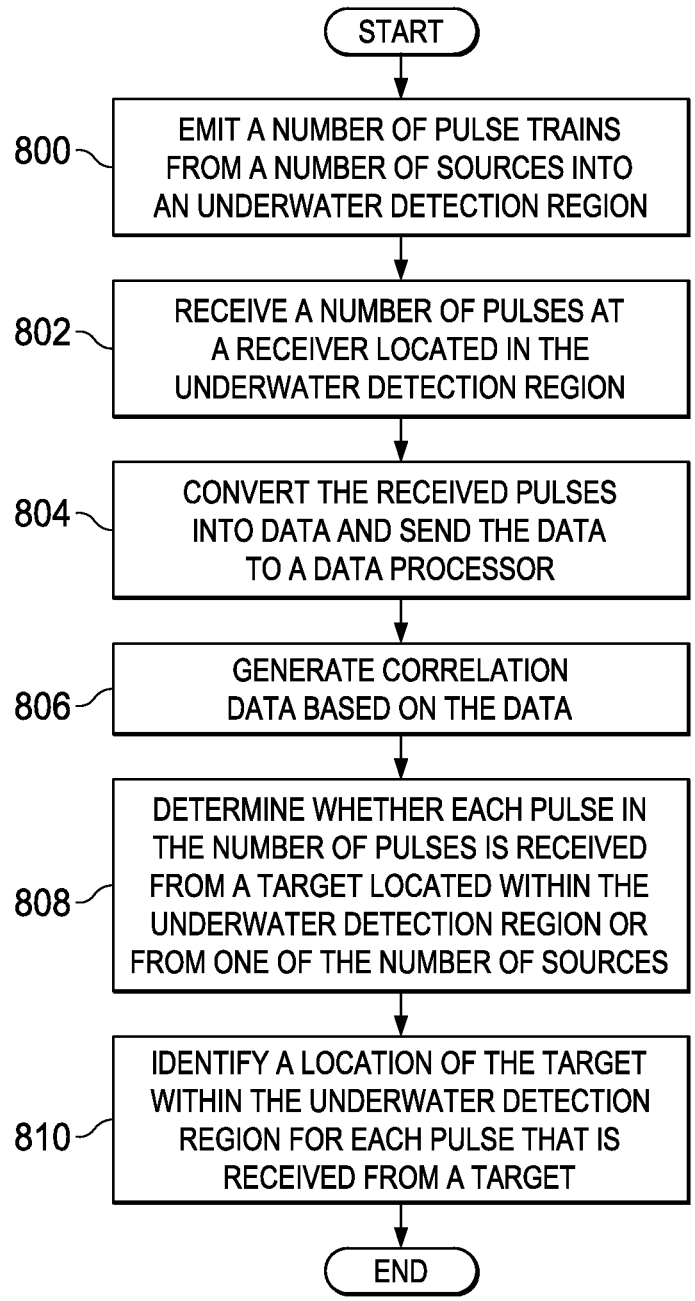
FIG. 8 is an illustration of a process for detecting targets in the form of a flowchart in accordance with an illustrative embodiment.

With reference now to FIG. 8, an illustration of a process for detecting targets is depicted in the form of a flowchart in accordance with an illustrative embodiment. The process illustrated in FIG. 8 may be implemented using the target detection system 92 described in FIG. 1.

The process begins by emitting a number of pulse trains from a number of sources into an underwater detection region (operation 800). In operation 800, each of the pulse trains is emitted by a corresponding one of the sources. Further, each pulse train is comprised of a series of identical pulses.

Next, the process receives a number of pulses at a receiver located in the underwater detection region (operation 802). The receiver converts the received pulses into data and sends the data to a data processor (operation 804). The data processor generates correlation data based on the data (operation 806). In operation 806, the correlation data includes a correlation peak that corresponds to each pulse received at the receiver.

Thereafter, the data processor determines whether each pulse in the number of pulses is received from a target located within the underwater detection region or from one of the number of sources (operation 808). For each pulse that is received from a target, the data processor identifies a location of the target within the underwater detection region (operation 810), with the process terminating thereafter.

With reference now to FIG. 9, an illustration of a process for detecting targets using a first approach is depicted in the form of a flowchart in accordance with an illustrative embodiment. The process illustrated in FIG. 9 may be implemented using a target detection system, such as the target detection system 92 described in FIG. 1.

More specifically, this process may be implemented using a data processor, such as the data processor 98 described in FIG. 1. Further, the first approach for detecting targets described in FIG. 9 may be used when all of the sources of the sonar system of the target detection system are configured to emit the same pulse train having the same characteristics.

The process begins by receiving data from the receiver (operation 900). The data may include the data generated by the receiver in response to receiving source pulses emitted directly from the sources located within the underwater detection region and one or more target pulses. These sources may be, for example, source sonobuoys. A target pulse may be the echo of a source pulse in which the source pulse has been reflected off, or rebounded off, a target located within the underwater detection region. All of the pulses emitted by the sources may be substantially identical. Further, the pulse train emitted by each of the sources may be identical in this illustrative example.

As the data is received, the data is compared to stored data for a pulse to generate correlation data comprising correlation peaks (operation 902). Each of the correlation peaks may represent a detection of a pulse.

The process then generates pulse data for the pulses received at the receiver using the correlation peaks in which the pulse data includes a time of arrival for the pulse and a direction from which the pulse was generated (operation 904). Of course, in some illustrative examples, the pulse data may include other types of data. When the pulse is a source pulse, the direction from which the pulse was generated is the bearing to the source. When the pulse is a target pulse, the direction from which the pulse was generated is the bearing to the target.

Next, the correlation peaks and/or the pulse data are analyzed to determine which of the correlation peaks correspond to target pulses and which of the correlation peaks correspond to source pulses (operation 906). Operation 906 may be performed based on prior training of the data processor to distinguish between source pulses and target pulses.

A determination is then made as to whether any target pulses have been detected (operation 908). If no target pulses have been detected, the process returns to operation 900 as described above. Otherwise, for each target pulse detected, the source from which the target pulse was originally emitted is identified using the steps described below.

In particular, for each target pulse detected, a time difference of arrival filter is applied (operation 910). In operation 910, the time of arrival for the target pulse is compared to the time of arrival for each of the source pulses. The source of any source pulse having a time of arrival that is earlier than the target pulse is removed from consideration.

Then, for each target pulse detected, a signal excess filter is applied (operation 912). In operation 912, a potential location for the target is calculated based on each of the remaining sources from which source pulses were detected. Further, the signal excess is calculated for each of the remaining sources from which source pulses were detected using the corresponding potential location for the target. The signal excess may be the signal level of the target pulse in decibels (dB) at the receiver relative to the signal level required for detection. In operation 912, any sources having a negative signal excess are removed from consideration.

Thereafter, for each target pulse detected, a bearing change filter is applied (operation 914). In operation 914, the target hold time is identified for each target pulse. The target hold time is the time period over which the target pulse was detected. Further, the bearing extent, which is the change in bearing to the target, is identified.

For each of the remaining sources being considered, a low value for the speed of the target is assumed. Based on this assumption, the expected change in bearing of the target over the target hold time is computed. If the change in bearing is greater than the computed bearing extent by more than some threshold, the source is removed from consideration.

The filters applied in operations 910, 912, and 914 may reduce the number of sources from which the target pulse originated prior to being rebounded off the target. For each target pulse detected, the source from which the target pulse originated prior to being rebounded off the target may be identified (operation 916). Next, a location for the target is identified for each target pulse detected based on the time of arrival of the target pulse and the time of arrival of the source pulse received from the identified source (operation 918), with the process then returning to operation 900 as described above.

In some cases, the location identified in operation 918 may need to be modified using a target tracker configured to track the movement of the target over time. The target tracker may be used to ensure that the locations identified in operation 918 are accurate within selected tolerances.

With reference now to FIG. 10, an illustration of a process for detecting targets using a second approach is depicted in the form of a flowchart in accordance with an illustrative embodiment. The process illustrated in FIG. 10 may be implemented using a target detection system, such as the target detection system 92 described in FIG. 1. More specifically, this process may be implemented using a data processor, such as the data processor 98 described in FIG. 1. Further, the second approach for detecting targets described in FIG. 10 may be used when each of the sources of the sonar system of the target detection system is configured to emit a pulse train having a different timing.

The process begins by receiving data from the receiver (operation 1000). The data may include the data generated by the receiver in response to receiving source pulses emitted directly from the sources located within the underwater detection region and one or more target pulses. The sources may be, for example, source sonobuoys. All of the pulses emitted by the sources may be substantially identical. However, the pulse trains emitted by the sources may have different timings.

For example, the timings may have been selected by alternating the time intervals between pulses between two selected time intervals. These time intervals may be selected by modifying a basic waveform consisting of a series of identical pulses having pulse duration, $T_R$, with each pulse being separated by $T_S$ seconds. The timing for each pulse train may be selected according to the following:

$$T_1 = T_S - nT_M/N$$

$$T_2 = T_S + nT_M/N,$$

where n=1, ..., N, and
where $T_1$ is the first time interval, $T_2$ is the second time interval, n is an index for the source, N is the total number of sources, and $T_M$ is the maximum allowed adjustment to the nominal pulse spacing, $T_S$.

As the data is received, the data is compared to stored data for a pulse to generate correlation data comprising correlation peaks (operation 1002). Each of the correlation peaks may represent a detection of a pulse.

The correlation data is used to detect target pulses that were received at the receiver (operation 1004). Operation 1004 is performed based on training of the data processor to distinguish between target pulses and source pulses. The time intervals between the times of arrival of the target pulses may be computed (operation 1006). These time intervals may be compared to the known timing for the pulse train emitted by each of the sources (operation 1008). This comparison is then used to identify the source from which the target pulses originated prior to being rebounded off the target (operation 1010).

Thereafter, the time difference of arrival is calculated as the difference between the time of arrival of the target pulse and the time of arrival of the source pulse from the identified source (operation 1012). The location of the target is identified using the time difference of arrival (operation 1014), with the process then returning to operation 1000 as described above. In operation 1014, the possible locations for the target may be identified by the ellipse formed by the time difference of arrival and the location of the receiver and the location of the identified source. The intersection of this ellipse with the line formed by the bearing to the target indicates the location of the target.

Figure 11:
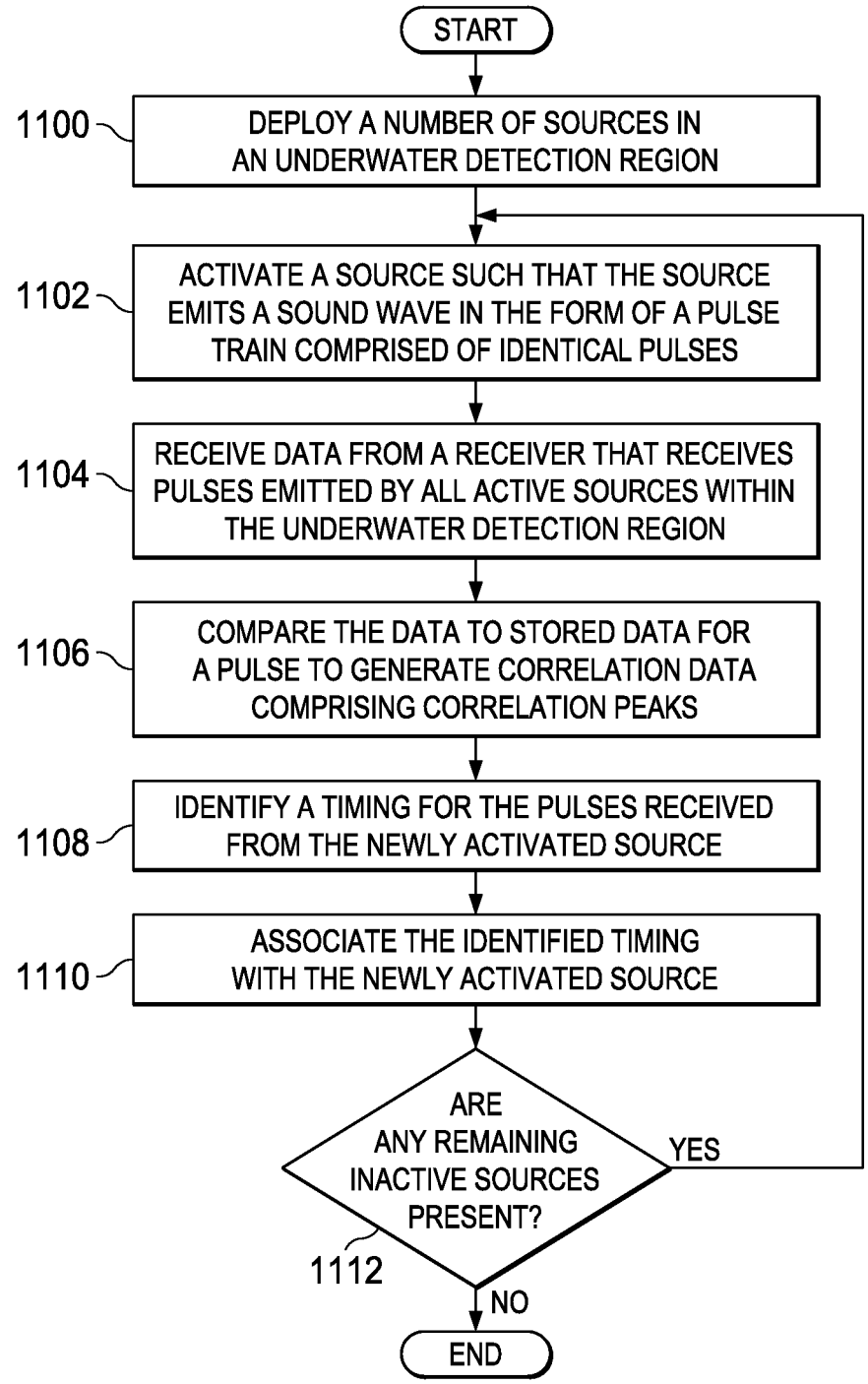
FIG. 11 is an illustration of a process for training a data processor to distinguish between source pulses and target pulses received at a receiver in the form of a flowchart in accordance with an illustrative embodiment.

With reference now to FIG. 11, an illustration of a process for training a data processor to distinguish between source pulses and target pulses received at a receiver is depicted in the form of a flowchart in accordance with an illustrative embodiment. The process illustrated in FIG. 11 may be implemented using a target detection system, such as the target detection system 102 described in FIG. 1.

This process may be one manner in which a data processor in the target detection system may be trained to distinguish between target pulses and source pulses received at a particular receiver such that operation 906 in FIG. 9 and operation 1004 in FIG. 10 may be performed. In some cases, the process described in FIG. 9 may be considered a calibration process for the target detection system.

The process begins by deploying a number of sources in an underwater detection region (operation 1100). When the sources are deployed, the sources are inactive. In other words, the sources are not emitting sound waves. A source is then activated such that the source emits a sound wave in the form of a pulse train comprised of identical pulses (operation 1102).

The data processor receives data from a receiver that receives pulses emitted by all active sources within the underwater detection region (operation 1104). The data processor compares the data to stored data for a pulse to generate correlation data comprising correlation peaks (operation 1106).

Next, the data processor identifies a timing for the pulses received from the newly activated source (operation 1108). When the newly activated source is not the first activated source, the data processor uses previously identified timings to identify the pulses received from the newly activated source.

The data processor associates the identified timing with the newly activated source (operation 1110). In this manner, operations 1108 and 1110 are performed to train the data processor to recognize pulses received from the newly activated source.

Thereafter, a determination is made as to whether any remaining inactive sources are present (operation 1112). If any remaining inactive sources are present, the process returns to operation 1102 as described above. Otherwise, the process terminates. In this manner, the data processor is trained to sequentially recognize the timings of the pulses emitted by each of the sources located in the underwater detection region. Once the data processor has been trained, the data processor is then able to identify any pulse that is received at an unexpected time as a target pulse. An unexpected time for a pulse may be any time that does not correspond with the timings identified for the sources by the data processor.

Turning now to FIG. 12, an illustration of a data processing system is depicted in the form of a block diagram in accordance with an illustrative embodiment. Data processing system 1200 may be used to implement data processor 98 in FIG. 1 or one or more computers that are used to implement data processor 98. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multiprocessor core, and/or some other type of processor, depending on the implementation. In some cases, processor unit 1204 may take the form of a hardware unit, such as a circuit system, an application specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a number of sources located within an underwater detection region, wherein each of the number of sources is configured to transmit a sound wave underwater within the underwater detection region in which the sound wave comprises a pulse train of identical pulses;
   a receiver configured to receive pulses within the underwater detection region and generate data in response to receiving the pulses; and
   a data processor configured to generate correlation data for the pulses in response to receiving the data from the receiver and to determine whether each of the pulses is received from a target located within the underwater detection region or from one of the number of sources.

2. The apparatus of claim 1, wherein responsive to a determination that a pulse in the pulses is received from the target, the data processor is further configured to identify a location of the target within the underwater detection region.

3. The apparatus of claim 1, wherein the correlation data comprises correlation peaks representing the pulses received at the receiver and wherein the data processor is further configured to generate pulse data for the pulses using the correlation data.

4. The apparatus of claim 3, wherein the data processor is further configured to identify a location of the target in the underwater detection region using the pulse data.

5. The apparatus of claim 3, wherein the pulse data includes at least one of a time of arrival, a bearing, a bearing extent, or a target hold time.

6. The apparatus of claim 1, wherein the pulse train is a chirped pulse train having a duty cycle of substantially 100 percent.

7. The apparatus of claim 1, wherein the pulse train has a timing for a period of the pulse train in which the timing comprises at least two selected time intervals.

8. The apparatus of claim 1, wherein the receiver is one of a number of receivers in which the number of receivers and the number of sources form a sonar system.

9. The apparatus of claim 1, wherein a source in the number of sources is implemented using a source sonobuoy and the receiver is implemented using a receiver sonobuoy.

10. The apparatus of claim 1, wherein the data processor comprises:
    a correlator configured to generate the correlation data for the pulses, wherein the correlation data comprises correlation peaks in which each of the correlation peaks corresponds to one of the pulses received at the receiver.

11. The apparatus of claim 10, wherein the data processor further comprises:
    a target data generator configured to generate target data for a set of target peaks in the correlation peaks.

12. The apparatus of claim 11, wherein the data processor further comprises:
    a target locator configured to identify a location of the target within the underwater detection region.

13. The apparatus of claim 1, wherein the data processor is located on an aerial platform and wherein the data processor is configured to receive the data over a wireless communications link.

14. A target detection system comprising:
    a sonar system comprising:
       a number of source sonobuoys configured to continuously transmit a number of sound waves underwater within an underwater detection region, wherein each of the number of sound waves comprises a pulse train of identical pulses; and
       a number of receiver sonobuoys configured to receive pulses within the underwater detection region, wherein a receiver in the number of receiver sonobuoys is configured to generate data in response to receiving the pulses; and
    a data processor in communication with the sonar system and configured to receive the data from the receiver, generate correlation data in response to receiving the data from the receiver, determine whether a target pulse has been received at the receiver from a target located within the underwater detection region using the correlation data, and identify a location of the target in response to a determination that the target pulse has been received.

15. A method comprising:
    transmitting a sound wave within an underwater detection region from each of a number of sources in which the sound wave comprises a pulse train of identical pulses;
    receiving pulses at a receiver within the underwater detection region and generating data in response to receiving the pulses; and
    generating correlation data for the pulses based on the data generated by the receiver; and
    determining whether each of the pulses received at the receiver is received from a target located within the underwater detection region or from one of the number of sources.

16. The method of claim 15, wherein transmitting the sound wave within the underwater detection region from each of the number of sources comprises:
    transmitting the sound wave continuously, wherein the sound wave comprises a chirped pulse train having a duty cycle of about 100 percent, wherein the identical pulses of the sound wave reduce cross-channel interference at the receiver.

17. The method of claim 16, wherein transmitting the sound wave within the underwater detection region from each of the number of sources comprises:
    transmitting the sound wave continuously, wherein the sound wave has a period of two pulses in which the period has at least two different time intervals.

18. The method of claim 15, wherein generating the correlation data for the pulses based on the data generated by the receiver comprises:
    generating correlation peaks in which each of the correlation peaks indicates a detection of a pulse received at the receiver.

19. The method of claim 15 further comprising:
    identifying a pulse received at the receiver from the target as a target pulse;

identifying a source from which the target pulse was originally emitted and a source pulse corresponding to the source; and identifying a location of the target using a time of arrival of the target pulse and a time of arrival of the source pulse.

20. The method of claim 15 further comprising:

identifying a pulse received at the receiver from the target as a target pulse; and identifying target data for the target pulse, wherein the target data includes at least one of a time of arrival, a bearing, a bearing extent, or a target hold time.

* * * * *